United States Patent [19]

Hill

[11] Patent Number: 4,923,651

[45] Date of Patent: May 8, 1990

[54] METHOD OF MANUFACTURING POLYIMIDE FOAM SHAPES HAVING IMPROVED DENSITY AND CELL SIZE UNIFORMITY

[75] Inventor: Francis U. Hill, San Diego, Calif.

[73] Assignee: Sorrento Engineering, Inc., National City, Calif.

[21] Appl. No.: 373,901

[22] Filed: Jun. 30, 1989

[51] Int. Cl.⁵ .............................................. C08J 9/22
[52] U.S. Cl. .................................. 264/45.1; 156/78; 156/245; 156/331.5; 156/331.8; 264/45.3; 264/53; 264/54; 264/71; 264/129; 264/140; 428/290; 428/314.4; 428/317.9; 428/319.1; 521/54; 521/184; 521/185; 521/189
[58] Field of Search .................. 264/45.1, 45.3, 53, 264/54, 71, 129, 140; 521/54, 184, 185, 189

[56] References Cited

U.S. PATENT DOCUMENTS

| | | | |
|---|---|---|---|
| 4,518,717 | 5/1985 | Long et al. | 521/185 |
| 4,520,071 | 5/1985 | Noda et al. | 521/185 |
| 4,865,784 | 3/1989 | Bongers et al. | 521/60 |

*Primary Examiner*—Morton Foelak
*Attorney, Agent, or Firm*—Frank D. Gilliam

[57] ABSTRACT

A method of manufacturing lightweight shapes from polyimide foam in which density discontinuities such as cavities, varying cell size, or swirl marks are substantially eliminated. A block or bun of polyimide foam is prepared in a conventional manner which results in a high density rind and other discontinuities. The foam is chopped into fine flakes in a chopper with a continuous flow of air to prevent electrostatic attachment of the flakes to the chopper and ducting. The flakes are mixed with a quantity of polyimide precursor and then heated to cause the precursor to bond the flakes into a uniform mass having highly uniform and predictable density. This is a very economical process since portions of the original bun may be used which would ordinarily be discarded. An alternative method is described whereby the flakes can be bonded together by using the precursor in the form of a partially cured foam either as a binder, or by making the flakes of partially cured foam.

10 Claims, 1 Drawing Sheet

METHOD OF MANUFACTURING POLYIMIDE FOAM SHAPES HAVING IMPROVED DENSITY AND CELL SIZE UNIFORMITY

BACKGROUND OF THE INVENTION

This invention relates in general to the manufacture of polyimide foam products and, more specifically, to the improvement in density uniformity in such products.

Polyimide foam has been used for some time for thermal insulation, cushions, structural members and the like. Polyimides are particularly desirable where high temperature resistance is required. They also have the feature, highly desirable in aircraft, spacecraft, ships, and other enclosed spaces where people are present, of producing essentially no toxic gases at high temperatures or when exposed to direct flame.

A variety of polyimide foam materials have been developed, such as those disclosed by Gagliani et al in U.S. Pat. No. 4,518,717 and Shulman et al in U.S. Pat. No. 4,467,597. Typical applications of polyimide foams to high temperature insulation structures are detailed in copending U.S. patent application Ser. No. 07/312,490 filed Feb. 21, 1989, now U.S. Pat. No. 4,865,784 and Ser. No. 07/167,796 filed Mar. 17, 1988 now U.S. Pat. No. 4,874,648 by Crosswhite et al.

While excellent results have been obtained with polyimide foams, several problems have been encountered which affect the quality and size of the final product. During foaming of the product, particularly with microwave heating, excess gases are often generated in localized areas causing voids or vents. Also, during foaming, swirling occurs which prevents the foam having uniform local density throughout the bun, with significant variations in cell size. A crust or rind forms on the outside of the bun, which is unusable in the product and must be trimmed away. There is considerable waste in trimming away the rind and non-uniform regions of the foam buns.

Thus, there is a continuing need for improved methods of manufacturing polyimide foam products which avoid non-uniform density regions and eliminates wasting large portions of the foamed buns due to non-uniform regions and rinds.

SUMMARY OF THE INVENTION

The above-noted problems, and others, are overcome by the method of this invention which basically comprises the steps of preparing a polyimide foam bun in a conventional manner, passing the foamed material (including rind and non-uniform regions) through a chopper which shreds the foam into fine flakes, mixing the flakes with a quantity of polyimide foam precursor then placing the mixture in a mold or other shaping means and curing the precursor. The density of the final foam is controlled by the quantity of material placed in the mold and the quantity of precursor used and can be as low as about 1.0 pound per cubic foot. The final foam product is free from cavities and vents and is of highly uniform density.

If desired, any high quality portions of the original bun may be cut out and reserved for use in those applications where as-foamed material is preferred. The remainder of the bun, which would ordinarily be useful in only less stringent applications or would be wasted is processed into high quality foam as described above.

Any suitable polyimide foam material ma be used as the bun material and as the bonding precursor. The bun may be made by any suitable method. Typical polyimide foam materials and methods of foaming are described in the above-mentioned Gagliani, Long and Shulman patents.

The foam flakes may have any suitable dimensions. Typically the flakes have lengths of from about 1/16 to $\frac{1}{8}$ inch, widths of from about 1/16 to $\frac{1}{8}$ inch and thicknesses of about $\frac{1}{8}$ to $\frac{1}{4}$ inch. The ratio of flake length the thickness is preferably at least about 2 to 1. The foam should not be ground to a fine powder since when powders are used in the method of this invention, the density of the final foam will be greater than about 6 pounds per cubic foot, much higher than is desirable for insulation and other light weight purposes.

If desired, the precursor powder may be at least partially foamed, but not fully cured, before mixing with the flakes. The prefoamed polyimide precursor materials may contain any suitable additives such as fillers, reinforcing materials, blowing agents or surfactants which are often desirable to improved uniformity of cell structure. Typical surfactants include BRIJ-78 from ICI Corp., FSN and Zonyl from E. I. duPont de Nemours & Co., L5302 and 15430 from Union Carbide Corp., 190 and 193 from Dow Corning Corp. and FC430 from Minnesota Mining and Manufacturing Co. While any suitable concentration of surfactant may be used, generally from about 0.5 to 2 wt %, based on the weight of the liquid foam precursor, is preferred. Typical fillers include glass microballoons, fibers, such as glass, graphite, Kevlar aramides, ceramics, fluorocarbon powders, etc.

The polyimide precursor mixed with the foam flakes may be in the form of a finely divided powder. In most cases, the same precursor as that used to make the original foam is preferred. Generally, best results are obtained where about 1 to 1 wt % of the flake/precursor powder is preferred. Alternatively, the precursor powder may be dissolved in a suitable solvent, such as an alcohol, then sprayed onto the foam flakes. The moist mixture generally should be dried before the final molding step.

After the final foam product is formed in the mold, various post-forming treatments or additions may be accomplished. The foam may be compressed and heated to thermally stabilize the foam at a lesser thickness. Various coverings may be applied after, or during, foam molding. Typical coverings include fabrics or mattes of fibrous materials such as glass fibers, Kevlar aramids, carbon filaments, etc., metal foils, plastic sheets, or the like. These materials may be bonded to the foam with any suitable adhesive. Polyimide adhesives are preferred.

If the coverings are placed in the mold during processing, the polyimide precursor mixed with the flakes may be sufficient to bond the foam to the covering. Alternatively, the coverings could have been coated with a solution of polyimide precursor in a solvent such as alcohol and dried to form a "pre-preg" sheet prior to being placed in the mold. Various other components, such as metal inserts, flanges, etc. may be bonded to the final foam product either during the final forming step or after the foam product is completed.

A plurality of layers of the final foam product may be bonded together with intervening layers of an adhesive, with or without layers of fabric, foil or the like between foam layers to form thick structures.

BRIEF DESCRIPTION OF THE DRAWING

Details of the invention, and of various preferred embodiments thereof, will be further understood upon reference to the drawing, wherein.

DETAILED DESCRIPTION OF PREFERRED EMBODIMENTS

Figure 1:
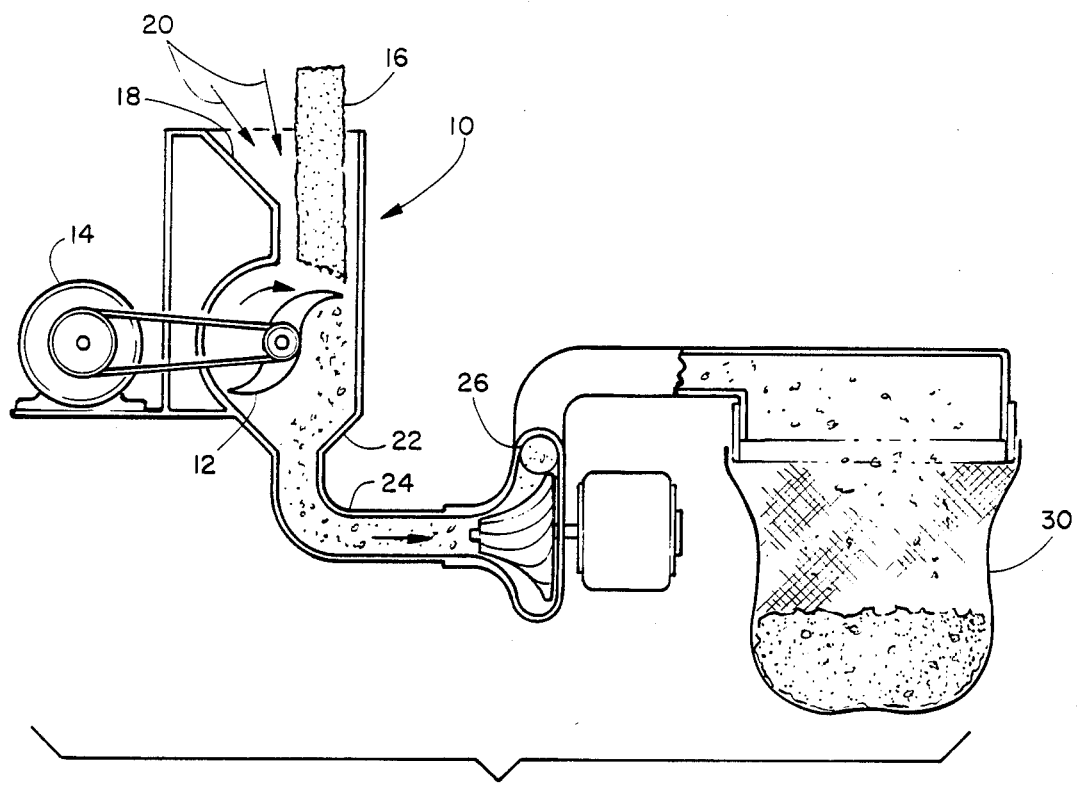
FIG. 1 is a schematic representation, partially cutaway, showing the method and apparatus for chopping foam into flakes.
Figure 2:
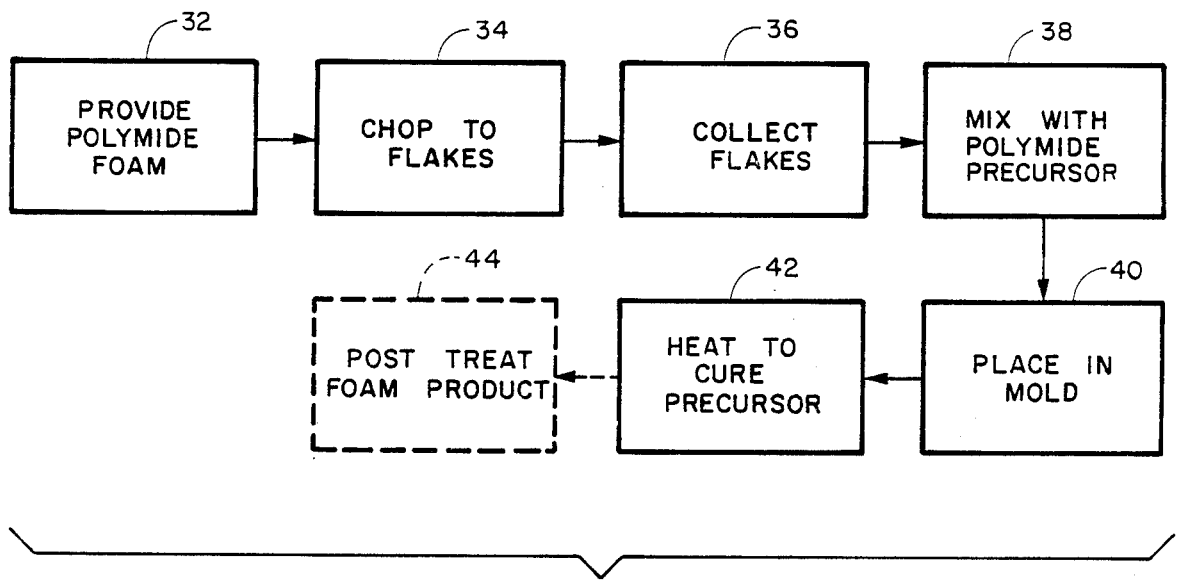
FIG. 2 is a flow sheet illustrating the overall process of forming uniform density polyimide foam products.

Referring now to FIG. 1, there is seen a schematic representation of a knife-type chopper 10. The chopper, of conventional design, used 8 rotating knives 4½ inches diameter having stationary blades spaced between the rotating knives. A 1 HP electric motor drove the rotating knives at about 5,000 rev. per minute. It was usually necessary to chop the material 3 times to get the desired flake size, and to make the flake size more uniform. Chopper 10 includes a plurality of rotating knife blades 12 driven by a motor 14. Foam blocks or pieces 16 are fed into chopper through a hopper 18 which also permits air to be drawn into the chopper as indicated by arrows 20. When foam 16 encounters blades 12 it is chopped into small flakes which exit chopper through hopper 22 into a large diameter duct 24.

Moving chopped foam through 10 and duct 24 is difficult because the chopping action causes a strong electrostatic charge to be built up on the small flakes. The flakes adhere tenaciously to all surfaces. In some cases, introducing a water spray mist into hopper 18 with foam 16 to slightly moisten the flakes will help reduce the electrostatic charge. However, we have found that drawing the flakes from the chopper with a centrifugal blower 26 of the sort used in conventional dust collectors is effective despite the electrostatic charge. Blower 26, driven by motor 28, draws a strong air current through chopper 10 to pull the flakes from the chopper, then directs them to bag filter 30, generally made from a fiberglass fabric. This action reduces the electrostatic charge on the flakes.

Bags 30 may then be easily emptied into any suitable container. Emptying should be done carefully, since rubbing the flakes together will reintroduce an electrostatic charge. Any suitable anti-static agent compatible with the other materials may be used, if desired.

The methods of forming polyimide foam products of uniform density, using the flaking method and apparatus of FIG. 1, is illustrated by the flow diagram of FIG. 1.

The initial step is to make or acquire suitable blocks or buns of polyimide foam as indicated in box 32. This conventional foam, made by any conventional method, as described above, may be entire foamed buns having a rind, swirls and cavities. Or, the foam could be the rind and scraps remaining after the best portions of the initial buns are removed for other uses.

Next, as shown in box 34, the initial foam material is chopped to flakes having the desired dimensions, using an apparatus of the sort shown in FIG. 1. The blade shape and speed and the foam feed rate are adjusted empirically to provide the desired flake characteristics.

As shown in box 36, the flakes are collected and made ready for the final molding operation. Any additives may be incorporated at this time.

The flake material is mixed with the polyimide precursor and prepared for molding. The flakes are preferably heated to a temperature of about 300° F. prior to mixing with a precursor powder to help the powder particles attach to the flakes. Alternatively, the precursor powder may be dissolved in a suitable solvent, such as an alcohol, then mixed with the foam flakes. In either case, the precursor uniformly thinly coats and flakes.

In an alternative embodiment, the flake material can be bonded into a flexible, resilient form incompletely cured foam as the binder instead of precursor powder or by making the flakes of incompletely cured foam and eliminating the binder. These two methods are simpler, and foam densities as, low as 0.6 lb per cubic foot can be achieved, with some sacrifice in product strength.

The mixture containing precursor powder is then placed in any suitable mold as shown in box 40. The mixture is heated to cure the polyimide precursor as indicated in box 42 and stabilize the final foam product. If higher density is required in the final product the material may be compressed to a suitable extent prior to the final heating step.

As discussed above, any suitable materials may be bonded to the finished foam or any suitable post-forming treatment may be given to the foam, as indicated in box 44. If desired, other materials, such as protective surface sheets may be placed in the mold prior to introduction of the mixture to provide simultaneous forming and bonding.

The final product is uniform, has no voids or other discontinuities, has no rind, and has a selected low density.

The following Examples detail certain preferred embodiments of our method. Parts and percentages are by weight unless otherwise indicated.

EXAMPLE I

About 300 grams of Monsanto 2601 "Skybond" polyimide prepolymer resin is mixed with about 1% by weight Dow-Corning 193 surfactant. The resin is rolled onto glass plates and dried with warm air at about 150° F. The dried resin coating is scraped off the glass and ground to a powder in a standard kitchen blender. The powder is then spread onto Teflon fluorocarbon coated glass fabric and foamed in a circulating air oven heated to about 350° F. for about 45 minutes. After foaming, the temperature is increased to about 575° F. for about 2 hours to cure the polyimide. The resulting flexible foam is then passed through a knife chopper 3 several times to ensure fine flakes, having an average longest dimension of about ¼ inch. A total of about 125 grams of flakes is produced which is then heated in a thermal oven at about 300° F. for about ½ hour. About 100 grams of the same ground precursor powder is then added to the flakes and vigorously mixed. The powder adheres to the surfaces of the flakes because the hot flakes are warm enough to make the powder slightly sticky. This mixture is compressed in the mold to about half of its loose volume, which requires very little pressure because of the softness of the foam flake layer. The mold is placed in a thermal oven at about 375° F. for about 30 minutes. Then, to complete cure of the polyimide, the temperature is increased to about 575° F. for about 2 hours. The resulting product is removed from the mold. The density is found to be about 1.2 pounds per cubic foot. The final product is compressible and flexible and has slightly reduced tensile strength compared to the as-foamed material.

EXAMPLE II

A reinforcing surface sheet is bonded to the surface of the product as follows. The product produced in Example I is lightly dusted with the Skybond prepolymer powder. Sheets of fiberglass fabric are placed against each face of the product and the assembly is returned to the mold in which the product has been made. The mold is returned to the circulating air oven and heated to about 350° F. for about 30 minutes, then the temperature is increased to about 550° F. for about 2 hours to fully cure the bonding polyimide. The mold is removed from the oven and cooled to room temperature. The product is removed from the mold. The face sheets are found to be uniformly well bonded to the product, which remains flexible. The product is now resistant to surface abrasion and does not dust or spall.

EXAMPLE III

About 300 grams of Skybond liquid polyimide prepolymer is mixed with about 3 grams of Zonyl surfactant from duPont. The mixture is thinned with about an equal volume of Formula 35A denatured alcohol from Atlas Chemical in San Diego, Calif. About 140 grams of polyimide foam flakes is prepared as described in Example I. The flakes are heated to about 300° F. and sprayed with the resin solution while vigorously mixing the flakes. The flakes are thoroughly dried and the mixture is placed in a mold which is coated with Teflon fluorocarbon mold release. The material is cured as described in Example I. The final product is very similar to that produced in Example I except that it is somewhat more rigid.

EXAMPLE IV

A mixture of polyimide foam and precursor powder is prepared as described in Example I. An aluminum mold frame is placed between the platens of a heated platen press, with the upper platen extending into the mold frame. The interior of the mold and platen faces are sprayed with No. 851-204 Teflon mold release spray, available from DuPont Corp, Wilmington, Del. The foam/powder mixture is placed within the mold frame on the lower platen and leveled to a thickness of about 4 inches. The platens are heated to about 400° F. The upper platen is lowered to reduce the thickness to about 2 inches and held for about 25 minutes to precure the polyimide precursor powder. The upper platen is then lowered to reduce the material thickness to about 1 inch and the temperature is increased to about 600° F. for about 2 hours to fully cure the powder and stabilize the part dimensionally. The finished product is cooled to room temperature and removed from the mold. The finished product has a density of about 2.5 pounds per cubic foot. It has excellent fire resistance and is suitable for use as facings for fire doors, firestop facings for electronic enclosures, or the like.

EXAMPLE V

Four flat sheets are produced by the method described in Example IV. In each case, the foam/precursor mixture is placed in the mold to a thickness of about 0.5 inch and compressed in the first compression step to a thickness of about 0.25 inch. The first panel contains a pre-determined amount of finely divided electrically conductive particles, available from any of a wide variety of industrial sources. The particles are mixed with the precursor powder just prior to mixing the precursor powder with the foam flakes. The second panel contains more particles than the first, and the third panel contains more than the second. The forth panel contains no particles. The panels are lightly dusted with a small quantity of the precursor powder and are stacked as follows: third panel, second panel, first panel and forth panel, that is, in progression from least to most particles. A light dusting of precursor powder is added between the joining faces of the panels. The assembly, having an overall thickness of about 1 inch, is returned to the platen press for the second curing, step as in Example IV during which the thickness of the assembly is reduced to about 0.5 inch. The final product is found to be an excellent microwave absorber and to be capable of operating in a temperature range exceeding 500° F. continuously.

EXAMPLE VI

Panels are prepared as described in Example IV, except that a sheet of fiberglass fabric, lightly dusted with a quantity of the polyimide precursor powder is placed in the bottom of the mold, which is curved instead of flat. The fiberglass fabric is on the convex side of the panel, which has the shape of a portion of a large-radius spherical surface. The material is two-stage pressed with heating as described in Example IV. The final product is highly transparent to microwaves and is suitable for use in assembling geodesic domes for radar monitoring stations or the like.

EXAMPLE VII

"Solimide" brand polyimide foam may be obtained from ImiTech, a Division of Ethyl Corporation, Elk Grove Village, Ill. 60007. This flexible foam is passed through a chopper two or more times to insure fine flakes having an average longest dimension of about ¼". A total of 125 grams of these flakes is produced which is then heated in a thermal oven at about 300° F. for about one hour. One hundred twenty five grams of the precursor powder described in Example I is added to the flakes and vigorously mixed. The material is placed in the mold and is compressed to about ½ of its loose volume. The mold is placed in a thermal oven at about 370° F. for about 30 minutes. To complete the cure of the polyimide the oven temperature is increased to about 450° F. for about two hours. The resulting product is removed from the mold. This final product weighing about 1.2 pounds per cubic foot is compressible and flexible but has reduced tensile strength compared to the as-foamed material.

EXAMPLE VIII

The flakes are prepared as outlined in Example I. The step of adding the precursor powder is omitted. The flakes are pressed into a mold and compressed to about ½ of the loose volume. The mold is then placed into a thermal oven at 600° F. for 30 minutes. The oven temperature is then increased to 650° F. for 10 minutes. The mold is removed and cooled. The resulting foam has a density of about 0.6 pounds per cubic foot and has adequate strength to be useful in insulating blankets as well as other applications where thermal and acoustic properties are more important than strength. By dusting the outside of the part with a slight amount of the precursor powder one can easily add fiberglass woven fabric such as type E-120 which gives added strength to the blanket, but adds little weight.

EXAMPLE IX

In this example the flakes are prepared exactly as in Example I. A separate amount of precursor powder is placed in an oven at 375° F. for 5 minutes. This causes the powder to foam but not to cure. This foam, which is reddish is than placed in an ordinary kitchen blender which reduces it to a fine powder. Equal parts of this powder and the flakes ar mixed together and compressed in a tool to ½ of the loose volume. Heat curing is the same as described in Example VIII. Material produced by this method has the advantage that the interstices are well filled with polyimide of equal density, although strength is lower.

EXAMPLE X

A precursor powder is prepared exactly as described in Example I. This precursor powder is placed in a thermal oven at about 375° F. for about ½ hour to cause the powder to foam. The oven temperature is then increased to about 450° F. for about 60 minutes. This yields a foam which can be handled but which has not yet been fully cross-linked. This immature foam is then passed through the chopper as described in Example I, which creates the partially cured flakes. These flakes are placed in an oven at about 600° F. for about 30 minutes and then the temperature is increased to about 650° F. for about 10 minutes. The resulting part has a density of about 0.7 pounds per cubic foot and is stronger than those demonstrated by Examples VIII and IX.

Certain specific materials, times, temperatures and other conditions have been detailed in the above description of preferred embodiments. These may be varied, where suitable, with similar results. Other applications, ramifications and variations of this invention will become apparent to those skilled in the art upon reading this disclosure. Those are intended to be included within the scope of this invention, as defined in the appended claims.

We claim:

1. The method of manufacturing polyimide foam shapes of uniform density which comprises the steps of:
   providing a quantity of polyimide foam having less than uniform density;
   chopping said foam into flakes having lengths less than about ¼ inch and a length to thickness ratio of at least about 2 to 1;
   mixing said flakes with a polyimide precursor powder;
   placing said mixture in a mold; and
   heating said mixture to the curing temperature of said precursor powder;
   whereby a foam product having highly uniform density and cell size results.

2. The method according to claim 1 wherein said precursor powder has substantially the same composition as the polyimide precursor material used to make said foam.

3. The method according to claim 1 including the further step of heating said foam prior to mixing with said powder to a temperature at which said powder will slightly melt and better adhere to said foam during said mixing.

4. The method according to claim 1 wherein said precursor powder is mixed with said flakes by dissolving said powder in a solvent, mixing the resulting solution with said flakes and drying said flakes.

5. The method according to claim 4 wherein said solvent is an alcohol.

6. The method according to claim 1 wherein said foam as provided contains significant discontinuities which may be rind, swirls and voids.

7. The method according to claim 1 wherein the mixture in said mold is compressed to less than about 50% of the original volume during said curing step.

8. The method according to claim 1 wherein said foam contains added components selected from the group consisting of surfactants, reinforcing agents, fillers, microwave absorbers and mixtures thereof.

9. The method of manufacturing polyimide foam shapes of uniform density which comprises the steps of:
   providing a quantity of less than fully cured polyimide foam having less than uniform density;
   chopping said foam into flakes having lengths less than about ¼ inch and a length to thickness ratio of at least about 2 to 1;
   placing said flakes in a mold having a volume less than the uncompressed volume of said flakes; and
   heating said mold to the final curing temperature of said flakes;
   whereby a foam product having highly uniform density and cell size results.

10. The method according to claim 9 wherein the quantity of flakes in said mold is compressed to less than about 50% of the original volume during the curing step.

* * * * *